United States Patent
Hamilton et al.

(10) Patent No.: US 9,076,173 B2
(45) Date of Patent: Jul. 7, 2015

(54) PRODUCT IDENTIFICATION USING MULTIPLE SERVICES

(71) Applicant: eBay Inc., San Jose, CA (US)

(72) Inventors: Scot Fraser Hamilton, Dublin, CA (US); Dinesh Kumar Damodharan, Santa Clara, CA (US); Bhupendra Jain, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 277 days.

(21) Appl. No.: 13/663,178

(22) Filed: Oct. 29, 2012

(65) Prior Publication Data

US 2013/0297437 A1 Nov. 7, 2013

Related U.S. Application Data

(63) Continuation of application No. 12/605,212, filed on Oct. 23, 2009, now Pat. No. 8,301,512.

(51) Int. Cl.
*G06Q 30/00* (2012.01)
*G06Q 30/06* (2012.01)
(Continued)

(52) U.S. Cl.
CPC ........ *G06Q 30/0601* (2013.01); *G06Q 30/0623* (2013.01); *G06Q 30/0643* (2013.01); *G06Q 10/00* (2013.01); *G06Q 30/0282* (2013.01); *G06Q 30/0613* (2013.01)

(58) Field of Classification Search
CPC .......... G06Q 30/0601; G06Q 30/0623; G06Q 30/0643; G06Q 99/00; G06Q 30/0282
USPC .................... 705/26.1, 26.61, 27.2, 500, 347
See application file for complete search history.

(56) References Cited

U.S. PATENT DOCUMENTS

| | | |
|---|---|---|
| 5,537,586 A | 7/1996 | Amram et al. |
| 5,740,425 A | 4/1998 | Povilus |
| 5,822,123 A | 10/1998 | Davis et al. |

(Continued)

FOREIGN PATENT DOCUMENTS

| | | |
|---|---|---|
| EP | 1841195 A1 | 10/2007 |
| WO | WO-2007061975 A2 | 5/2007 |
| WO | WO-2007061975 A3 | 5/2007 |

OTHER PUBLICATIONS

"MyComicShop.com", Search for Mad (Magazine #24 on) #158, [Online]. Retrieved from the Internet: http://www.mycomicshop.com/search?tid=353271&pgi=151, (Accessed Feb. 10, 2012), 22 pages.*

(Continued)

*Primary Examiner* — Nicholas D Rosen
(74) *Attorney, Agent, or Firm* — Schwegman Lundberg & Woessner, P.A.

(57) ABSTRACT

A method and a system to determine a product identification of an item for sale in an online publication system is shown and described. For example, the method may be initiated when an input identifying an item is received from a user. An input type (e.g., image, text, audio recording, etc.) may be determined and one or more identification services may be selected based on the input type. At least a portion of the input is transmit to the selected one or more identification services. A product identification is received from each of the one or more identification services. Based on the received product identifications, a recommended product identification is determined. The recommended product identification is transmitted to the user.

20 Claims, 5 Drawing Sheets

(51) Int. Cl.
*G06Q 10/00* (2012.01)
*G06Q 30/02* (2012.01)

(56) References Cited

U.S. PATENT DOCUMENTS

| | | | |
|---|---|---|---|
| 5,950,173 | A | 9/1999 | Perkowski |
| 6,029,141 | A | 2/2000 | Bezos et al. |
| 6,044,363 | A | 3/2000 | Mori et al. |
| 6,119,101 | A | 9/2000 | Peckover |
| 6,122,648 | A | 9/2000 | Roderick |
| 6,144,958 | A | 11/2000 | Ortega et al. |
| 6,151,601 | A | 11/2000 | Papierniak et al. |
| 6,216,264 | B1 | 4/2001 | Maze et al. |
| 6,230,156 | B1 | 5/2001 | Hussey |
| 6,266,649 | B1 | 7/2001 | Linden et al. |
| 6,401,084 | B1 | 6/2002 | Ortega et al. |
| 6,410,084 | B1 | 6/2002 | Klare et al. |
| 6,598,026 | B1 | 7/2003 | Ojha et al. |
| 6,631,522 | B1 | 10/2003 | Erdelyi |
| 6,641,037 | B2 | 11/2003 | Williams |
| 6,697,800 | B1 | 2/2004 | Jannink et al. |
| 6,697,824 | B1 | 2/2004 | Bowman-Amuah |
| 6,853,982 | B2 | 2/2005 | Smith et al. |
| 6,904,410 | B1 | 6/2005 | Weiss et al. |
| 6,928,425 | B2 | 8/2005 | Grefenstette |
| 7,228,298 | B1 | 6/2007 | Raines |
| 7,295,995 | B1 | 11/2007 | York et al. |
| 7,366,721 | B1 | 4/2008 | Bennett et al. |
| 7,886,156 | B2 | 2/2011 | Franchi |
| 8,086,502 | B2 | 12/2011 | Krishnamurthy et al. |
| 8,194,985 | B2 | 6/2012 | Grigsby et al. |
| 8,301,512 | B2 | 10/2012 | Hamilton et al. |
| 8,306,872 | B2 * | 11/2012 | Inoue et al. ............ 705/26.7 |
| 8,489,438 | B1 * | 7/2013 | Ibrahim ............... 705/7.11 |
| 8,819,039 | B2 | 8/2014 | Grove et al. |
| 2002/0026353 | A1 | 2/2002 | Porat et al. |
| 2002/0082893 | A1 | 6/2002 | Barts et al. |
| 2002/0082953 | A1 | 6/2002 | Batham et al. |
| 2002/0083448 | A1 | 6/2002 | Johnson |
| 2002/0154157 | A1 | 10/2002 | Sherr et al. |
| 2003/0036964 | A1 | 2/2003 | Boyden et al. |
| 2003/0083961 | A1 | 5/2003 | Bezos et al. |
| 2003/0105682 | A1 | 6/2003 | Dicker et al. |
| 2003/0204449 | A1 | 10/2003 | Kotas et al. |
| 2003/0216971 | A1 | 11/2003 | Sick et al. |
| 2004/0128320 | A1 | 7/2004 | Grove et al. |
| 2004/0210479 | A1 | 10/2004 | Perkowski et al. |
| 2005/0251409 | A1 | 11/2005 | Johnson et al. |
| 2006/0031216 | A1 * | 2/2006 | Semple et al. .............. 707/4 |
| 2006/0085477 | A1 * | 4/2006 | Phillips et al. ............ 707/104.1 |
| 2006/0106683 | A1 | 5/2006 | Fisher et al. |
| 2006/0143158 | A1 | 6/2006 | Ruhl et al. |
| 2006/0190352 | A1 | 8/2006 | Zeidman |
| 2007/0112968 | A1 * | 5/2007 | Schwab ................... 709/229 |
| 2007/0118441 | A1 | 5/2007 | Chatwani et al. |
| 2007/0179848 | A1 * | 8/2007 | Jain et al. .................. 705/14 |
| 2008/0059331 | A1 | 3/2008 | Schwab |
| 2009/0113475 | A1 * | 4/2009 | Li .............................. 725/39 |
| 2009/0304267 | A1 | 12/2009 | Tapley et al. |
| 2010/0076867 | A1 * | 3/2010 | Inoue et al. ................. 705/27 |
| 2010/0086192 | A1 | 4/2010 | Grigsby et al. |
| 2010/0214302 | A1 | 8/2010 | Melcher et al. |
| 2011/0099085 | A1 | 4/2011 | Hamilton et al. |
| 2014/0372244 | A1 | 12/2014 | Grove et al. |

OTHER PUBLICATIONS

Kotas, Paul, et al., "Use of Electronic Catalog to Facilitate User-to-User Sales", U.S. Appl. No. 60/336,409, filed Oct. 31, 2001, 45 pages.*

"U.S. Appl. No. 09/730,538, Advisory Action mailed May 9, 2007", 3 pgs.

"U.S. Appl. No. 09/730,538, Advisory Action mailed Aug. 7, 2007", 3 pgs.

"U.S. Appl. No. 09/730,538, Advisory Action mailed Dec. 23, 2003", 3 pgs.

"U.S. Appl. No. 09/730,538, Amendment filed Sep. 20, 2012", 16 pgs.

"U.S. Appl. No. 09/730,538, Amendment Under 37 CFR 41.33 mailed Jul. 30, 2007", 8 pgs.

"U.S. Appl. No. 09/730,538, Appeal Brief filed Jan. 14, 2008", 17 pgs.

"U.S. Appl. No. 09/730,538, Appeal Brief filed Aug. 2, 2007", 30 pgs.

"U.S. Appl. No. 09/730,538, Decision on Appeal mailed Jul. 20, 2012", 6 pgs.

"U.S. Appl. No. 09/730,538, Examiner's Answer mailed Jun. 23, 2009", 9 pgs.

"U.S. Appl. No. 09/730,538, Examiner's Answer mailed Jul. 21, 2009", 9 pgs.

"U.S. Appl. No. 09/730,538, Final Office Action mailed Feb. 28, 2007", 8 pgs.

"U.S. Appl. No. 09/730,538, Final Office Action mailed Apr. 3, 2006", 9 pgs.

"U.S. Appl. No. 09/730,538, Final Office Action mailed Aug. 11, 2003", 7 pgs.

"U.S. Appl. No. 09/730,538, Final Office Action mailed Dec. 7, 2004", 8 pgs.

"U.S. Appl. No. 09/730,538, Non Final Office Action mailed Feb. 6, 2004", 7 pgs.

"U.S. Appl. No. 09/730,538, Non Final Office Action mailed May 4, 2005", 8 pgs.

"U.S. Appl. No. 09/730,538, Non Final Office Action mailed Sep. 19, 2006", 8 pgs.

"U.S. Appl. No. 09/730,538, Non-Final Office Action mailed Feb. 27, 2003", 6 pgs.

"U.S. Appl. No. 09/730,538, Pre-Appeal Brief Request filed May 29, 2007", 5 pgs.

"U.S. Appl. No. 09/730,538, Response filed Jan. 17, 2006 to Non-Final Office Action mailed May 4, 2005", 19 pgs.

"U.S. Appl. No. 09/730,538, Response filed Mar. 7, 2005 to Final Office Action mailed Dec. 7, 2004", 19 pgs.

"U.S. Appl. No. 09/730,538, Response filed Apr. 30, 2007 to Final Office Action mailed Feb. 28, 2007", 18 pgs.

"U.S. Appl. No. 09/730,538, Response filed May 27, 2003 to Non Final Office Action mailed Feb. 27, 2003", 11 pgs.

"U.S. Appl. No. 09/730,538, Response filed May 28, 2004 to Non-Final Office Action mailed Feb. 6, 2004", 17 pgs.

"U.S. Appl. No. 09/730,538, Response filed Jul. 3, 2006 to Final Office Action mailed Apr. 3, 2006", 17 pgs.

"U.S. Appl. No. 09/730,538, Response filed Aug. 1, 2005 to Non final Office Action mailed May 4, 2005", 16 pgs.

"U.S. Appl. No. 09/730,538, Response filed Nov. 25, 2003 to Final Office Action mailed Aug. 11, 2003", 19 pgs.

"U.S. Appl. No. 09/730,538, Response filed Nov. 30, 2006 to Non Final Office Action mailed Sep. 19, 2006", 14 pgs.

"U.S. Appl. No. 09/730,538, Response to Notice of Non-Compliant Appeal Brief filed Jan. 14, 2008", 17 pgs.

"U.S. Appl. No. 10/648,125, Advisory Action mailed Feb. 11, 2009", 3 pgs.

"U.S. Appl. No. 10/648,125, Advisory Action mailed Jun. 9, 2005", 4 pgs.

"U.S. Appl. No. 10/648,125, Appeal Brief filed Jul. 16, 2010", 35 pgs.

"U.S. Appl. No. 10/648,125, Decision on Pre-Appeal Brief Request mailed Apr. 16, 2010", 2 pgs.

"U.S. Appl. No. 10/648,125, Examiner Interview Summary mailed Jan. 6, 2006", 3 pgs.

"U.S. Appl. No. 10/648,125, Examiner Interview Summary mailed Oct. 16, 2008", 2 pgs.

"U.S. Appl. No. 10/648,125, Examiner's Answer to Appeal Brief mailed Oct. 14, 2010", 47 pgs.

"U.S. Appl. No. 10/648,125, Final Office Action mailed Jan. 4, 2010", 39 pgs.

"U.S. Appl. No. 10/648,125, Final Office Action mailed Jan. 9, 2006", 29 pgs.

"U.S. Appl. No. 10/648,125, Final Office Action mailed Mar. 24, 2005", 19 pgs.

(56) References Cited

OTHER PUBLICATIONS

"U.S. Appl. No. 10/648,125, Final Office Action mailed Jul. 24, 2007", 27 pgs.
"U.S. Appl. No. 10/648,125, Final Office Action mailed Oct. 10, 2008", 56 pgs.
"U.S. Appl. No. 10/648,125, Final Office Action mailed Dec. 4, 2008", 33 pgs.
"U.S. Appl. No. 10/648,125, Non Final Office Action mailed Feb. 21, 2008", 53 pgs.
"U.S. Appl. No. 10/648,125, Non Final Office Action mailed May 13, 2009", 36 pgs.
"U.S. Appl. No. 10/648,125, Non Final Office Action mailed Aug. 25, 2005", 14 pgs.
"U.S. Appl. No. 10/648,125, Non Final Office Action mailed Sep. 1, 2004", 22 pgs.
"U.S. Appl. No. 10/648,125, Non Final Office Action mailed Dec. 7, 2006", 27 pgs.
"U.S. Appl. No. 10/648,125, Pre-Appeal Brief Request mailed Mar. 4, 2010", 5 pgs.
"U.S. Appl. No. 10/648,125, Reply Brief filed Nov. 2, 2010", 10 pgs.
"U.S. Appl. No. 10/648,125, Response filed Jan. 3, 2005 to Non Final Office Action mailed Sep. 1, 2004", 18 pgs.
"U.S. Appl. No. 10/648,125, Response filed Feb. 4, 2009 to Final Office Action mailed Dec. 4, 2008", 13 pgs.
"U.S. Appl. No. 10/648,125, Response filed Mar. 4, 2009 to Final Office Action mailed Dec. 4, 2008", 14 pgs.
"U.S. Appl. No. 10/648,125, Response filed May 7, 2007 to Non Final Office Action mailed Dec. 7, 2006", 14 pgs.
"U.S. Appl. No. 10/648,125, Response filed May 24, 2005 to Final Office Action mailed Mar. 24, 2005", 21 pgs.
"U.S. Appl. No. 10/648,125, Response filed Jun. 23, 2008 to Non Final Office Action mailed Feb. 21, 2008", 19 pgs.
"U.S. Appl. No. 10/648,125, Response filed Jul. 10, 2006 to Final Office Action mailed Jan. 9, 2006", 14 pgs.
"U.S. Appl. No. 10/648,125, Response filed Jul. 25, 2005 to Advisory Action mailed Jun. 9, 2005", 9 pgs.
"U.S. Appl. No. 10/648,125, Response filed Sep. 14, 2009 to Non Final Office Action mailed May 13, 2009", 14 pgs.
"U.S. Appl. No. 10/648,125, Response filed Oct. 30, 2007 to Final Office Action mailed Jul. 24, 2007", 13 pgs.
"U.S. Appl. No. 10/648,125, Response filed Dec. 16, 2005 to Non Final Office Action mailed Aug. 25, 2005", 9 pgs.
"U.S. Appl. No. 11/426,993, Final Office Action mailed Jul. 22, 2010", 17 pgs.
"U.S. Appl. No. 11/426,993, Final Office Action mailed Sep. 16, 2011", 16 pgs.
"U.S. Appl. No. 11/426,993, Non Final Office Action mailed Feb. 24, 2010", 22 pgs.
"U.S. Appl. No. 11/426,993, Non Final Office Action mailed Jun. 21, 2012", 17 pgs.
"U.S. Appl. No. 11/426,993, Non Final Office Action mailed Dec. 23, 2010", 18 pgs.
"U.S. Appl. No. 11/426,993, Response filed Jan. 7, 2010 to Restriction Requirement mailed Dec. 7, 2009", 5 pgs.
"U.S. Appl. No. 11/426,993, Response filed Apr. 28, 2010 to Non Final Office Action mailed Feb. 24, 2010", 10 pgs.
"U.S. Appl. No. 11/426,993, Response filed Jun. 23, 2011 to Non Final Office Action mailed Dec. 23, 2010", 8 pgs.
"U.S. Appl. No. 11/426,993, Response filed Sep. 18, 2012 to Non Final Office Action mailed Jun. 21, 2012", 10 pgs.
"U.S. Appl. No. 11/426,993, Response filed Oct. 15, 2010 to Final Office Action mailed Jul. 22, 2010", 43 pgs.
"U.S. Appl. No. 11/426,993, Response filed Dec. 15, 2011 to Final Office Action mailed Sep. 16, 2011", 9 pgs.
"U.S. Appl. No. 11/426,993, Restriction Requirement Dec. 7, 2009", 8 pgs.
"U.S. Appl. No. 12/605,212, Non Final Office Action mailed Feb. 16, 2012", 11 pgs.
"U.S. Appl. No. 12/605,212, Notice of Allowance mailed Jun. 28, 2012", 12 pgs.
"U.S. Appl. No. 12/605,212, Response filed May 16, 2012 to Non Final Office Action mailed Feb. 16, 2012", 8 pgs.
"International Application Serial No. PCT/US03/41543, Demand for Preliminary Examination mailed Jun. 10, 2004", 5 pgs.
"International Application Serial No. PCT/US03/41543, International Preliminary Report mailed Apr. 27, 2005", 6 pgs.
"International Application Serial No. PCT/US03/41543, International Preliminary Report mailed Apr. 14, 2004", 7 pgs.
"International Application Serial No. PCT/US03/41543, Written Opinion mailed Aug. 26, 2004", 9 pgs.
"New Text and Social Messaging Features Expand Frucall's Voice-Based", Primezone, (Aug. 31, 2006), 1 pg.
"U.S. Appl. No. 10/648,125, Appeal Decision mailed Jan. 30, 2014", 12 pgs.
"U.S. Appl. No. 10/648,125, Examiner Interview Summary filed Jun. 12, 2014", 1 pg.
"U.S. Appl. No. 10/648,125, Examiner Interview Summary mailed Mar. 28, 2014", 2 pgs.
"U.S. Appl. No. 10/648,125, Notice of Allowance mailed Apr. 21, 2014", 14 pgs.
"U.S. Appl. No. 10/648,125, Reply Brief filed Mar. 26, 2014", 65 pgs.
"U.S. Appl. No. 14/318,525, Preliminary Amendment filed Jun. 30, 2014", 8 pgs.
"U.S. Appl. No. 14/318,525, Supplemental Preliminary Amendment filed Aug. 14, 2014", 3 pgs.

* cited by examiner

PRODUCT IDENTIFICATION USING MULTIPLE SERVICES

CLAIM OF PRIORITY

This application is a continuation of U.S. application Ser. No. 12/605,212 filed Oct. 23, 2009, which application is incorporated in its entirety herein by reference.

TECHNICAL FIELD

The present application relates generally to the technical field of computer technology and data processing and, in one specific example, to product identification using multiple services.

BACKGROUND

In an online publication system, users may submit data such as images, voice recordings, and text for publication. The data may be augmented by a description or other information that is provided by the user, in systems where one or more users may repeatedly submit the same or similar data, the submission of the data may be redundant and cumbersome to the user.

BRIEF DESCRIPTION OF THE DRAWINGS

Some embodiments are illustrated by way of example and not limitation in the figures of the accompanying drawings in which.

DETAILED DESCRIPTION

Figure 1:
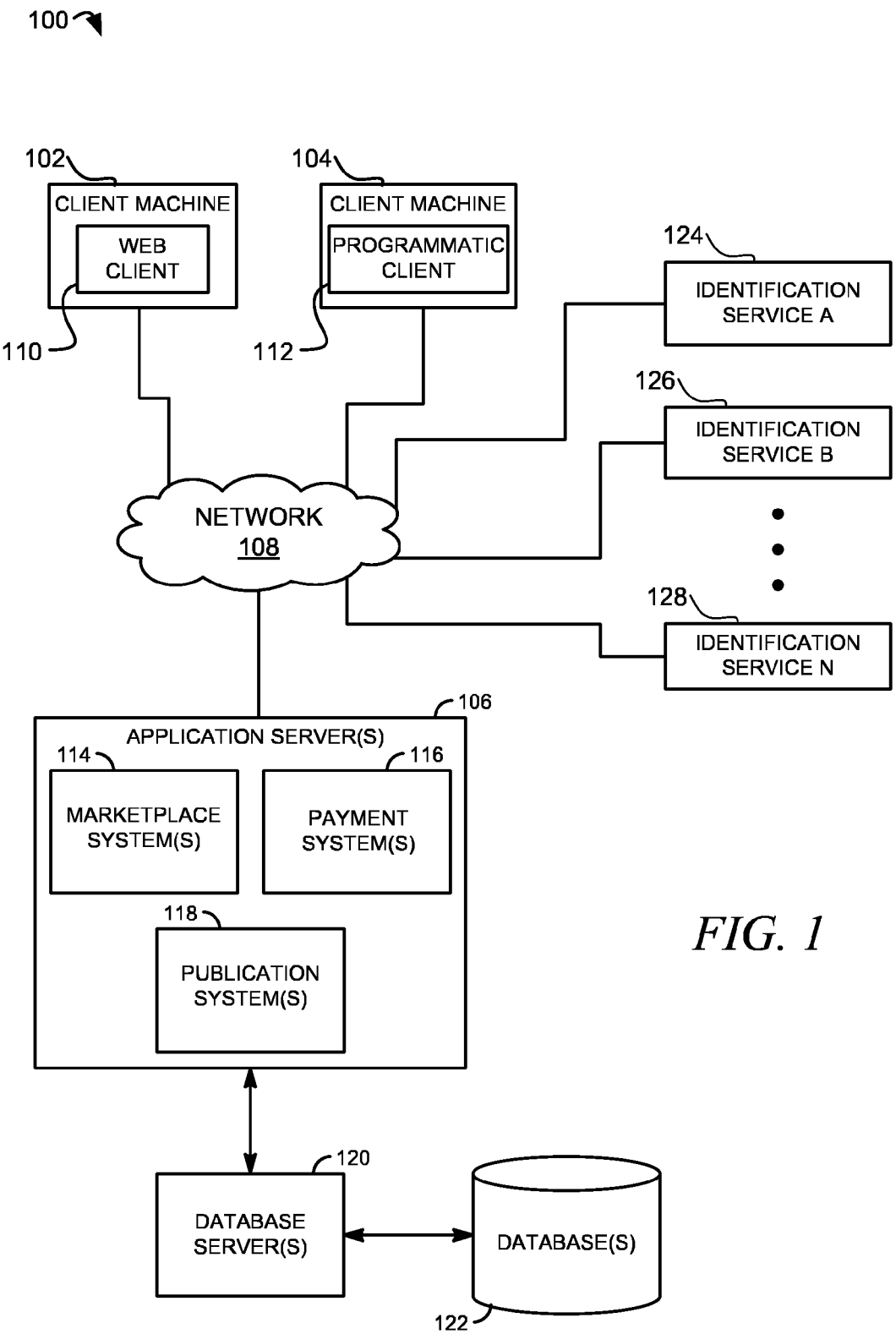
FIG. 1 Is a network diagram of an example computing environment according to various embodiments.

Example methods and systems to identify products using multiple product identification services are described. In the following description, for purposes of explanation, numerous specific details are set forth in order to provide a thorough understanding of example embodiments. It will be evident, however, to one skilled in the art that the present invention may be practiced without these specific details.

In an online publication system such as in an online shopping environment or online registry where users can post listings of items or services for sale, it may be desirable to provide an abbreviated posting process for users who regularly post to the online publication system. These users may have preferences regarding how the postings are presented to other users or have preferences regarding content that is repeated in each posting. Some of these users make few changes to a new posting relative to a previous posting. This is especially true if the new posting is for an item or service similar to an item or server in the previous posting.

For example, in online publication systems that are associated with an online shopping environment, the users may comprise sellers who sell goods on the online shopping environment. The sellers may have regular policies such as return policies, shipping policies, payment policies, and the like that apply to at least a portion of the seller's postings.

Some online shopping environments may have a catalog of products that describe identical or nearly identical items for sale. A product may be, in one example, a particular make and model of a computer printer. When a seller decides to sell a printer of that particular make and model, the sell may associate the printer for sale to the product in the catalog that describes the make and model of the printer. The catalog may be divided, by domains or types of products. The products in the catalog may include a description, one or more images, reviews of the products, or the like. Some sellers find it desirable to associate their postings and items for sale with a product in the catalog to help potential buyers identify their items for sale.

According to various embodiments, an input is received from a seller that identifies an item for sale. The input may be a barcode (or image of a barcode), an image of the item, for sale, a voice recording, a text string, etc. The input is analyzed and transmitted to one or more identification services which identify the item for sale as a particular product. Upon receipt of possible product identifications from the identification services, a recommended product identification to associate with the item for sale is selected. The product identification that is ultimately associated with the item tor sale may depend on various factors such as, but not limited to, a proportion of identification services identifying the item for sale as the product, seller history, demand information, etc.

Some sellers may wish to more easily associate their item with a product in a catalog without taking the time to browse through a catalog, input a long text string, or perform other time-consuming tasks. The products and the catalog may he used to generate a posting from a remote location or from a device such as a handheld device.

The systems and methods described herein generally provide a fast and easy way to identify an item for sale, associate the item for sale with a product in a catalog, and generate a listing that includes one or more seller preferences to be posted in an online publication, system such as an online shopping environment.

Architecture

FIG. 1 is a network diagram of an example computing environment according to various embodiments. A networked system 100, in the example forms of a network-based marketplace or publication system, provides server-side functionality, via a network. 108 (e.g., the internet or Wide Area Network (WAN)) to one or more clients. FIG. 1 illustrates, for example, a web client 110 (e.g., a browser, such as the Internet Explorer® browser developed by Microsoft Corporation of Redmond, Washington State), and a programmatic client 112 executing on respective client machines 102 and 104.

One or more application servers 106 host one or more marketplace systems 114, payment systems 116, and publication systems 118. The application servers 106 are, in turn, shown to be coupled to one or more databases servers 120 that mediate access to one or more databases 122.

The marketplace systems 114 may provide a number of marketplace functions and services to users that access the networked system 100. The payment systems 116 may likewise provide a number of payment services and functions to users. The payment systems 116 may allow users to accumulate value (e.g., in a commercial currency, such as the U.S. dollar, or a proprietary currency, such as "points") in accounts, and then later to redeem the accumulated value for products (e.g., goods or services) that are made available via the marketplace systems 114. While the marketplace and payment systems 114 and 116 are shown in FIG. 1 to both form part of the networked system 100, it will be appreciated that, in alternative embodiments, the payment systems 116 may form, part of a payment service that is separate and distinct from the networked system 100.

The publication systems 118 within the application servers 106 may provide publication functions and services to users that access the networked system 100. Additionally or alternatively, the publication systems 118 provide one or more user interfaces for users to generate, transmit, and review products and items for sale within the network-based marketplace. In some instances, the publication systems 118 may form a part of the marketplace systems 114 or be separate from marketplace systems 114.

Further, while the networked system 100 shown m FIG. 1 employs a client-server architecture, the present embodiments are of course not limited to such an architecture, and could equally well find application in a distributed, or peer-to-peer, architecture system, for example. The various marketplace, payment, and publication systems 114, 116, and 118 could also be implemented as standalone software programs, which do not necessarily have networking capabilities.

The web client 110 accesses the various marketplace, payment, and publication systems 114, 116, and 118 via a web interface. Similarly, the programmatic client 112 accesses the various services and functions provided by the marketplace, payment, and publication systems 114, 116, and 118 via a programmatic interface provided by an API server. The programmatic client 112 may, for example, be a seller application (e.g., the TurboLister application developed by eBay Inc., of San Jose, Calif.) to enable sellers to author and manage listings on the networked system 100 in an off-line manner, and to perform batch-mode communications between the programmatic client 112 and the networked system 100.

FIG. 1 also illustrates a number of identification services such as identification service A 124, identification service B 126, and identification service N 128. The identification services 124, 126, and/or 128 may be a part of the application servers 106 or may be separate from the application servers 106. The identification services 124, 126, and/or 128 may receive an input item a client machine 102 or 104 or the application servers 106, and, in particular, the publication systems 118. Based on the input, the identification services 124, 126, and/or 128 provide a product identification of the item for sale as a particular product. For example, an input to an identification service may comprise an image of an item that a user wishes to offer to sell in the online market place. The identification service may compare the image to one or more images of known products to determine a closest match to the item in the image. In some instances, the various identification services may be categorized according to the input that each may receive and analyse. For example, identification service A 124 may identify a product based on an image, identification service B 126 may identify a product based on a barcode, and identification service N 128 may identify a product based on an audio recording.

Figure 2:
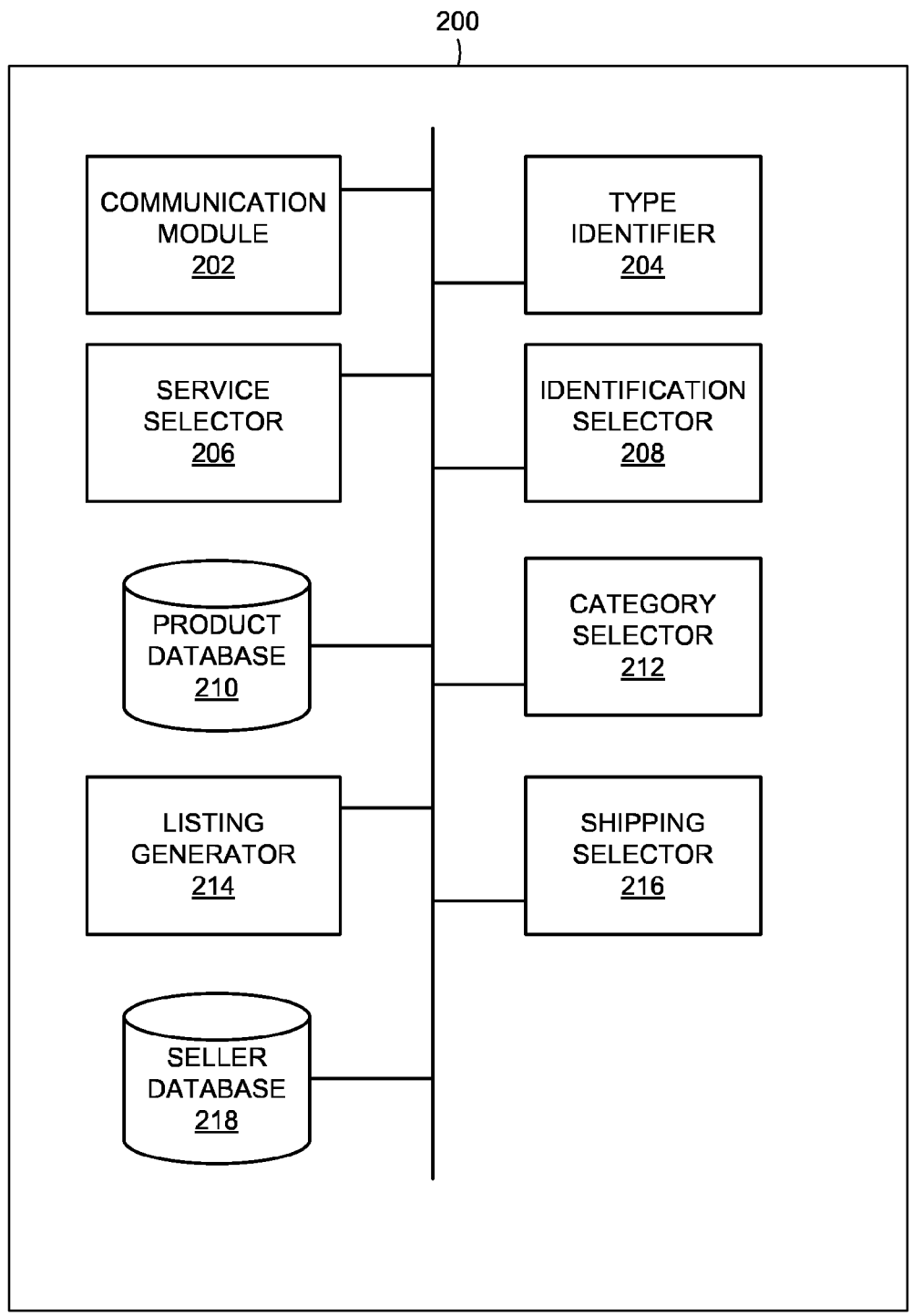
FIG. 2 is a block diagram of an example publication system according to various embodiments.

FIG. 2 is a block diagram of an example publication system 200 according to various embodiments. In some instances, the publication system 200 may be the publication system 118 of FIG. 1. The publication system 200 may comprise a communication module 202 configured to communicate with the marketplace system 114 and the payment system 116. The communication module 202 may also communicate with the identification services 124, 126, and 128, and with the client machines 102 and 104 via the network 108. In some instances, where an external database is accessed during the course of operation, the communication module 202 may communicate with the database server(s) 120 and the database(s) 122.

A type identifier 204, upon receiving an input from a user via the network 108, determines an input type. The input type may be an image, a text string, an audio file, a video, etc. In some instances, the type identifier 204 may identify words, bar codes, and/or symbols from an image file.

Based on the input type identified, a service selector 206 selects one or more identification services 124, 126, and/or 128 to identify the item for sale. The selection may be based on the input received from the seller, a cost charged by the identification service, or on capabilities of the identification service. The service selector 206 may be modified by an administrator based on, for example, one or more preferences for identification services such as past performance of the respective identification services and relative costs for using the identification service. For example, the service selector 206 may, if a barcode has been scraped from a image of an item for sale by the type identifier 204, send only the bar code portion of the input to an identification service that is limited to identifying bar codes rather than a more expensive identification service able to recognise a product from a image.

In some instances, the service selector 206 may include and/or access a contracts database (not shown). The contracts database stores information related to one or more contracts with each of the identification services 124, 126, and 128. For example, the information may include a threshold number of identifications the identification service is contracted for over a specified period of time (e.g., 10,000 identifications per month), a graduated rate (e.g., first 2,000 identifications for a first rate, the next 2,000 identifications for a second rate, and so on), a per-identification cost of the service, and the like. In some instances, the service selector 206 may record the number of identifications sent to a particular identification service and/or track compliance to the service contract. In some instances, the service selector 206 may include one or more heuristics or artificial intelligence modules (e.g., a neural network) for selecting an identification service based on the contractual requirements, the cost per identification, or the like.

An identification selector 208 receives one or more product identifications from each of the identification services 124, 126, and 128 that the input or a portion of the input was sent to by the service selector 206. Based on the product identifications, the identification selector 208 selects the most relevant product identification from the received product identifications, in some instances, the identification selector 208 may provide a display of an organized list of the received product identifications for display to a user so that the user may select a product identification to associate with the item for sale. In other instances, the identification selector 208 may automatically select a single product identification from more than one product identifications as described, for example in connection with FIG. 4.

If the identification selector 208 does not receive a product identification from the identification services (e.g., no matches are found), the identification selector 208 transmits a user interface to the user at the client machine 102 or 104. The user interface may be used to manually selector identify a product Identification corresponding to the item for sale.

The identification selector 208 may access a product database 210. The product database 210 may be a part of the database(s) 122 shown in FIG. 1 or may be a separate database specific to the publication system 200. The product database 210 stores descriptions of the products. In some instance, the product database 210 additionally stores a location of the product in a catalog, sales history of the product, and one or more items for sale corresponding to the product.

When the item is identified with a product identification, a category selector 212 selects a category for the item for sale from one or more potential categories. The category selector 212 may rely on factors such as a category where the product sold for a highest price, past user queries for the product, or pre-defined category preferences of the user providing the posting for publication. In some instances, the category information may be stored in a catalog database (not shown). The category selector 212 may provide a user interlace if the item for sale corresponds to a product that is categorized in more than one way. The user may then manually provide the category using the user interface. For example, a particular make and model of a primer may be categorized as a "computer peripheral," a "home electronic devices" and/or an "office supply."

The category selector 212 may, in some embodiments, provide an interface to the user to select a category based on factors such as highest price, fastest selling time, highest visibility, categories where the seller has other active listings or routinely posts listings, or the like. In other instances, the category selector 212 may automatically select a category based on the product identification of the item for sale.

A listing generator 214 generates a listing for the item for sale to be published within the publication systems 200. The listing generally includes the product information of the item for sale, a condition of the item for sale, seller information, sale format (e.g., auction, fixed price, etc), price, shipping information, etc. The listing generator 214 may provide an interface for the user to provide information not included in the product information or may populate a listing using one or more databases and/or modules.

To illustrate, to provide shipping information in a listing, a shipping selector 216 may determine a location of the user (e.g., seller) when the user provides the input. The location of the user is based on, for example, an IP address, a GPS location received via a GPS module on a handheld device, a cell triangulation technique, or the like. Based on the location of the user, one or more shipping options are identified. The shipping selector 216 may provide an interface for the user to select at least one of the shipping options available, or the shipping selector 216 may automatically select the at least one shipping option available based on, for example, a stored seller preference.

To populate the listing, a seller database 218 is accessed by the listing generator 214. The seller database 218 stores seller preferences such as, seller information, whether seller accepts returns, return policies, a number of days to return an item, how to return an item, who bears the cost of a returned item, payment policies, sale format a minimum price if sale format is an auction, fixed price if sale format is fixed price, quantity, shipping cost, shipping carrier, condition, etc. In some instances, the seller database 218 may include more than one set of preferences for the seller. In these instances, the listing generator 214 may provide an interface for the seller to select a set of preferences to associate with that particular listing.

If a set of seller preferences is incomplete or if the seller has not set a default for a particular preference, the listing generator 214 may provide a user interface to be displayed to the user at the client machine where the user can select an option from a menu. The menu may be generated based on selections previously made by the user. In some embodiments, the user interface may allow the user to manually enter a preference.

The listing generator 214 may provide the generated listing to the client machine for display to the user. The user may, in turn, accept or reject, all or part of the generated listing. Upon the user accepting the generated listing, the listing is published. If the user rejects some or all of the generated listing, an interface may be provided to the user where the user can manually input changes and/or select changes from a menu. In some instances, the system may save the unapproved listings and allow the user to modify the listing at a later time.

Figure 3:
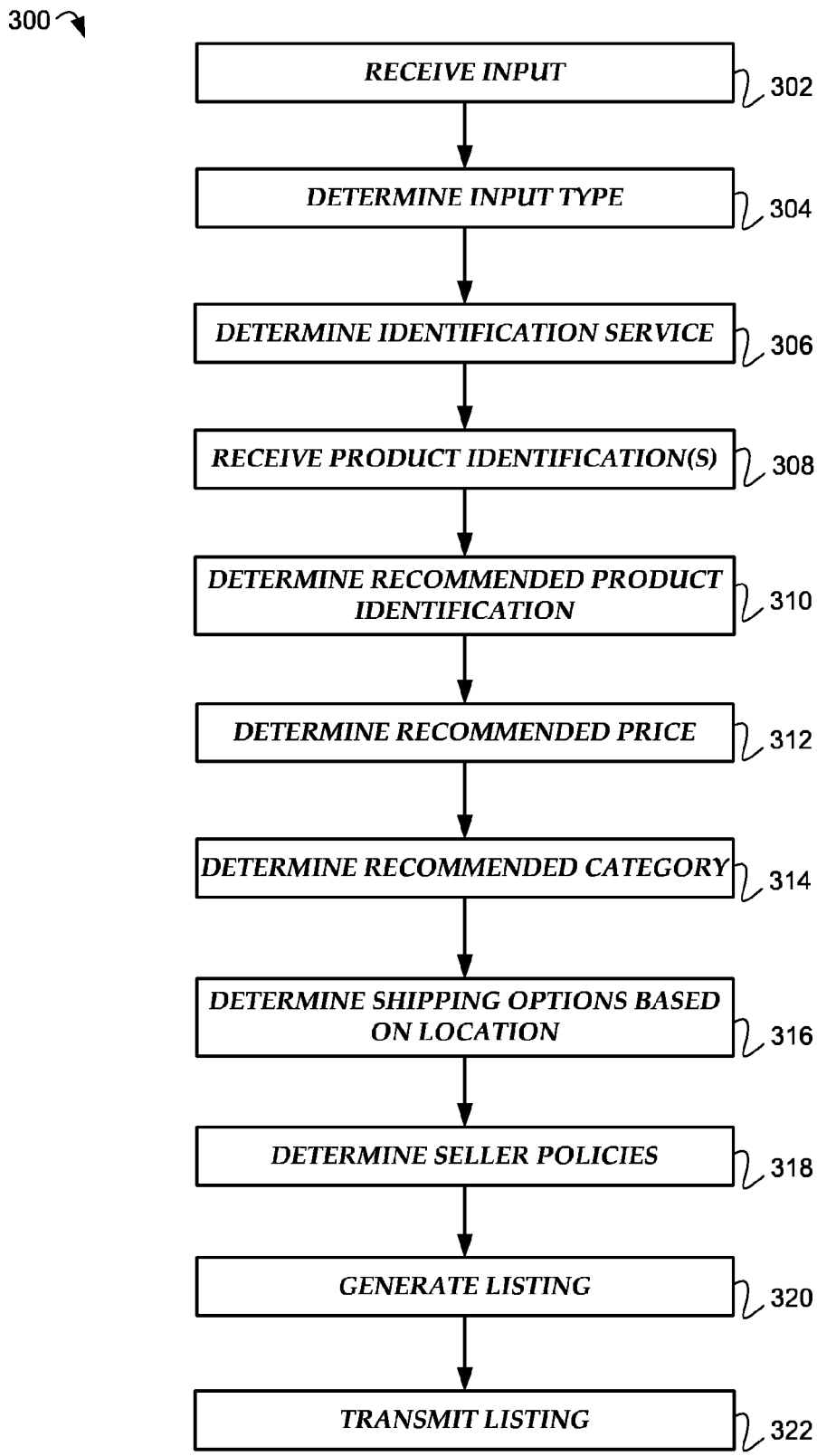
FIG. 3 is a flowchart of a process for generating a listing as performed in some embodiments.

FIG. 3 is a flowchart of a process 300 for generating a listing as performed in some embodiments. The process 300 may be performed by the publication systems 118 or 200. The process 300 permits the seller of an item for sale to post a listing in an online publication system based on an input such as an image of the item for sale.

In an operation 302, the input is received from the seller via a client machine and a network. The input may comprise an image, a bar code, a text string, a voice recording, a video recording, or the like. In some instances, the input is captured by a handheld device (e.g., a mobile telephone or smart phone) having a camera, microphone, text input (e.g., keypad), and/or barcode reader.

In an operation 304, an input type is determined. The input may be an image, a bar code, a text, portion of the image, a symbol or logo within an image, an audio file, a video file, a text string, etc. Examples of input types include, but are not limited to: whole image, partial image of text, partial image of barcode, barcode, ISBN, video, audio, and text.

In an operation 306, one or more identification services are determined. The identification services may be determined based on the input type determined in operation 304, relative cost of identification services, relative accuracy of the identification services, and the like. Once the identification services are determined, the input (or a portion of the input) is sent to the identification services. For example, a bar code parsed from an image of the entire item may be sent as a portion of the input to a bar code identification service.

The input may be sent to the one or more identification services sequentially or simultaneously. The determination of the identification services and/or whether the input is sent to each at the same time or at different times may be based on a pre-defined policy and/or as determined by the service selector 206 (FIG. 2). In some instances, the policy may identify more than one identification service if a determination is made that receiving an accurate product identification is more likely using a combination of identification services. To illustrate, an image identification service may be used, in part, to identify a barcode in a larger image. That barcode may, in turn, be sent to a bar code identification service.

In an operation 308, the product identifications are received from the identifications services to which the input was sent in operation 306. The product identifications may be alphanumerical based on SKU numbers, bar codes, ISBN numbers, etc. In some embodiments, the product identification may be based on a product catalog.

In an operation 310, a recommended product identification is determined. The recommended product identification may be based on one or more product identifications received from the product identification services. Generally, at least two product identifications are received, although any number of product identifications are contemplated. In some instances, a first portion of the product identifications may be received from product identification services outside of the online publication system and a second portion may be determined by an internal identification service (not shown) with the publication systems 118. The two or more product identifications are compared, and, if matching, used as the recommended product identification.

If, however, the product identifications do not match, other recommended product identifications are determined in a variety of ways. For example, a recommended, product recommendation may be selected by the identification selector 208 from the received product identifications, the input may be sent to at least one additional product identification service to receive additional product identifications, the input may be further analyzed, and/or the user may be prompted to re-capture and/or re-submit the input of operation 302.

In an operation 312, a recommended price is determined. The recommended price may be based on past sale prices (e.g., stored in the product database) of the product corresponding to the recommended product identification. In some embodiments, a price recommendation may he modified based on an amount of time another item for sale corresponding to the same product has been posted without selling, a number of searches by potential buyers for the product, or the like. In some instances, pricing information may be collected from other merchants or publication systems via the network 108 (FIG. 1) using, for example, a web bot or a web crawler.

In an operation 314, a recommended category is determined. For some products, there may be only one category based on the catalog. However, for a significant portion of products, the same product may be listed, in more than one category or in more than one location in a catalog. In some instances, a plurality of distinct product catalogs may be available based, for example, on product domains. Product domains are types of products such as, for example, autos, jewelry, toys, collectibles, house wares, electronics, etc.

A recommended category may be based on, for example, relative sale price of the product within each potential categorization, a time to sell within each categorization, a relative visibility of each categorization, or similar concerns. A recommended price may be independently determined for each possible category. The recommended category may also be based on seller preferences or seller history. In some instances, more than one category may be ultimately recommended to a seller. The recommended category may, additionally or alternatively, be based on categorizations developed by publication systems other than publication system 200. These categorizations may be collected via, for example, a web bot, web crawler, or information provided by manufacturers, resellers, distributors, other merchants and marketplaces, or the like.

In an operation 316, snipping options are determined based on a location of the seller or the item. The origin, is determined by way of a geographical location of the client machine from which the input is received. In some instances, the client machine may be a mobile, portable, or handheld device having GPS or cellular capabilities. In some instances, a seller may have predefined shipping preferences stored in a seller profile on which the shipping options may be based.

In an operation 318, the seller policies are determined. Seller policies may include handling time (i.e., an amount of time to process a completed transaction), return policy, and/or accepted payment methods. Each seller policy may be aggregated with other policies of the same seller in a seller profile corresponding to the seller. The seller profile is accessible by the seller when generating a listing.

In some instances, a single seller may have more than one seller profile. Each profile includes an aggregate of seller policies that the seller may, in turn, define separately. The profiles of a single seller may be more or less complete relative to the other profiles. For example, a first profile may include a return policy, a handling time, and payment methods while a second seller policy may only include payment methods. The payment methods policy in the first seller profile may be the same as or different from the payment methods policy in the second seller profile.

If the seller has more than one seller profile, the seller may have the option of applying different seller profiles based on the listings themselves or on the categories associated with those listings. For example, a first profile comprising a return policy and a handling time policy may be directed to media goods like compact discs. The seller may also be associated with a second profile for listings in a clothing category that may, in turn, include an exchange policy or a longer handling time to fulfill custom orders. The seller may manually select the seller profile for each listing. Alternatively, a seller profile may be selected based on a recommended category of the listing.

In some instances, the publication system 200 may provide or recommend seller policies or changes to a seller profile based on past behavior of the seller or the seller profiles of other sellers offering the same or similar items for sale. In response to a determination that certain seller polices are popular or unpopular with buyers, the more popular seller policies may be recommended to sellers having less popular seller policies. This determination based, for example, on buyer surveys, buyer complaints, and/or a determination that a buyer chose to buy the same (or similar) good from one seller ever another based on a seller policy.

In an operation 320, the listing is generated by aggregating the recommended product identification, price recommendation, categorization, shipping options, and seller policies according to a predetermined template or format in some instances, the format of the listing may be seller-specific. For example, some sellers may use a template to format listings and/or prefer a particular font, text size, background, graphic, or layout.

In an operation 322, the generated listing is transmitted to the client machine. The user may view the generated listing and confirm that the information in the listing is accurate and desirable. In some instances, a user interface may be provided for the user to add, delete, or modify portions of the listing. Menus or separate user interfaces may allow the user to select potential modifications from a menu. For example, if the user identifies that the product identification is incorrect, the user interface may include a menu having one or more alternative product identifications distinct from the recommended product identification. A similar user interface may be provided to modify a categorization or a seller policy, for example. Other portions, such as price, may be modified via a text field.

In instances where a recommended product identification is incorrect and the alternate product identifications (if provided) are also incorrect, a user interface for manually selecting a product from a catalog to associate with the item for sale is provided. A categorization may be additionally or alternatively selected in this fashion. When a correct product identification or categorization is identified by a user, the other portions of the listing (e.g., price, shipping, seller polices) may be determined by the publication system as described above.

When the seller confirms that the listing is correct, the listing is published in the online publication system for potential buyers to view and purchase. It is noted that throughout process 300, a seller may be prompted to provide additional input regarding any portion of the listing to be generated. For example, in the operation 314, a prompt may be provided to the seller to confirm the recommended product category. The prompt may include information about each category such as, for example, recommended price, expected time to self or visibility of the category.

Figure 4:
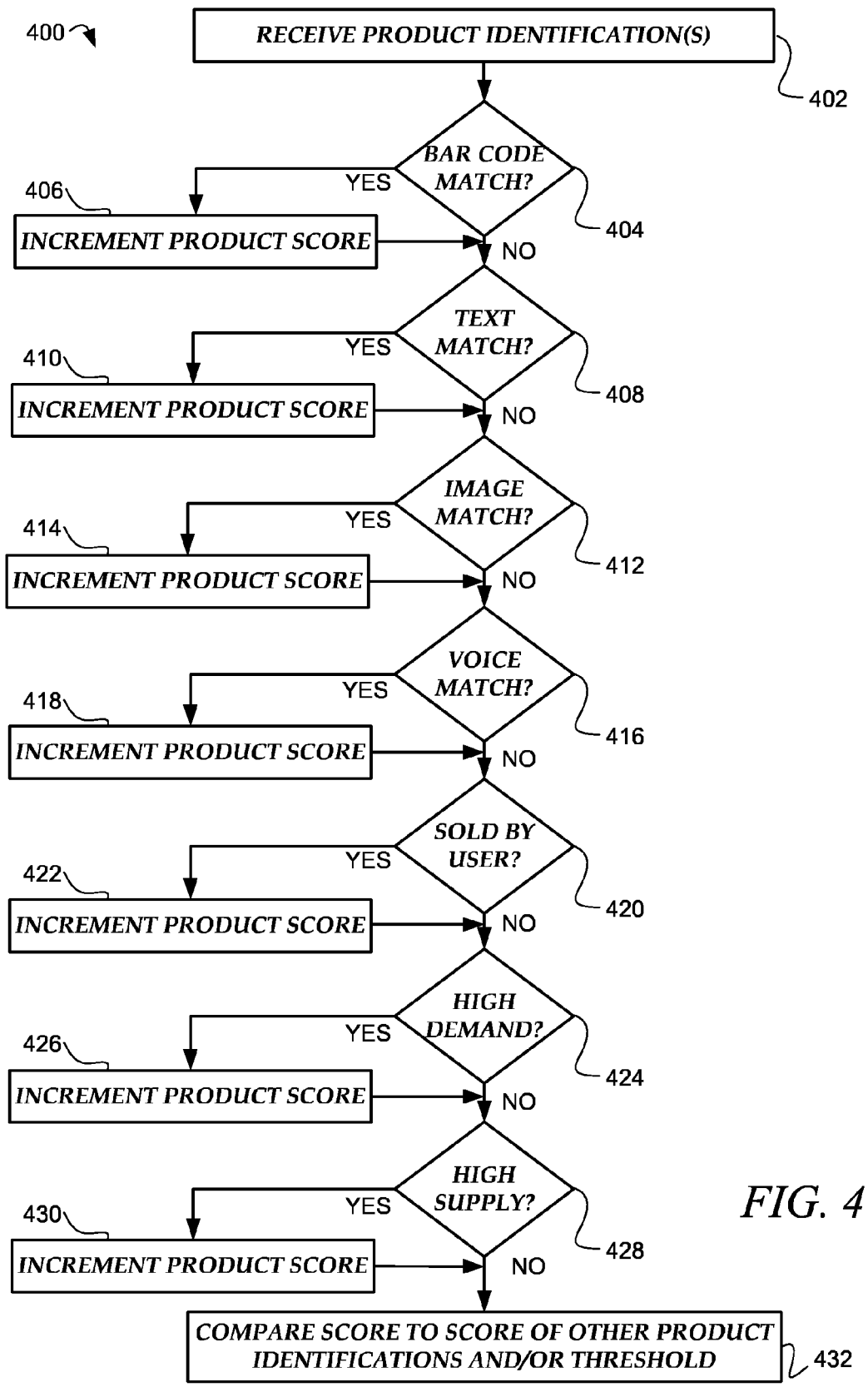
FIG. 4 is a flowchart of an example process for selecting a product identification.

FIG. 4 is a flowchart of an example process 400 for selecting a recommended product identification from more than one received product identification. Generally, the recommended product identification may be selected using a variety of algorithms and techniques such as heuristics, thresholds, artificial intelligence such as neural networks, etc. The process 400 is provided for the purposes of illustration and is not intended to be limiting. It is noted that alternatives are readily apparent to those skilled in the art.

In an operation 402, the product identifications are received from the product identification services. The received product identifications may be supplemented by one or more product identifications determined by product identification services internal to the publication system itself. Each of the product-identifications may be associated with an initial product score that can be incremented and/or decremented based on a set of heuristics. The product score may be used to ultimately select the recommended product identification.

In an operation 404, a determination is made as to whether product identifications based on a bar code match one another. If at least two product identifications match, the product score is incremented in an operation 406. It is noted that more than one product score may be incremented. For example, if four product identifications are received and two match a first product while the other two match a second product, both product scores may he incremented. Each item corresponding to a product identification may be associated with a product score. In instances where more than two product identifications identify the same item (e.g., using a bar code or other feature), the product score may be incremented based on the number of matching product identifications.

In an operation 408, a determination is made as to whether product identifications based on a text string match. The text string may be input by the user directly or indirectly. To indirectly input a text string, the user may, for example, capture on image of text, such as a title of a book, and the test may be captured using an optical character recognition (OCR) technique. If at least two of the product identifications match, the product scores may be incremented in the operation 410.

In an operation 412, a determination is made as to whether product identifications based on an image match. Based on the determination of operation 412, the product score may be incremented in operation 414. Similarly, in an operation 416, a determination is made as to whether product identifications based on a voice recording match, and, in an operation 418, a product score may be incremented accordingly.

In an operation 420, a determination is made as to whether a particular product identification matches an item previously sold by the seller. In some instances, a seller has more than one item for sale corresponding to a particular product. As such, if a seller has previously sold a particular Item, it is more likely that the present item for sale matches the previous item for sale. In an operation 422, the product score may be incremented based on the determination of operation 422.

In an operation 424, a determination is made based on a demand for a particular product. The demand may be determined based on a number of searches or user queries for the product by a potential buyer, an average or median amount of time elapsed before sale of the product, a change in price associated with the product, and/or other factors. Based on the demand for the product being higher than the demand for another product and/or meeting a predefined threshold (e.g., number of queries), the product score may be incremented in an operation 426.

In an operation 428, a determination is made based on supply of the product. The supply is indicative of the number of items currently for sale that correspond to the product. The supply may be based solely on the seller, a portion of sellers, or all sellers. In operation 430, the product score may be incremented based on the determination that the supply is high. The determination that the supply is high may be measured relative to the other product identifications and/or be based on a threshold, (e.g., a number of items currently for sale).

In operations 406, 410, 414, 418, 422, 426, and 430, the product score may be incremented in a variety of ways. For example, the amount that each product score is incremented may be weighted based on the determination(s) preceding the increment. The determinations may include a determination of an amount by which to increment the product score.

In an operation 432, the product score associated with each unique product identification is compared to each other product score or to a threshold. The greatest product score that meets or exceeds the threshold may be identified as the recommended product identification.

Figure 5:
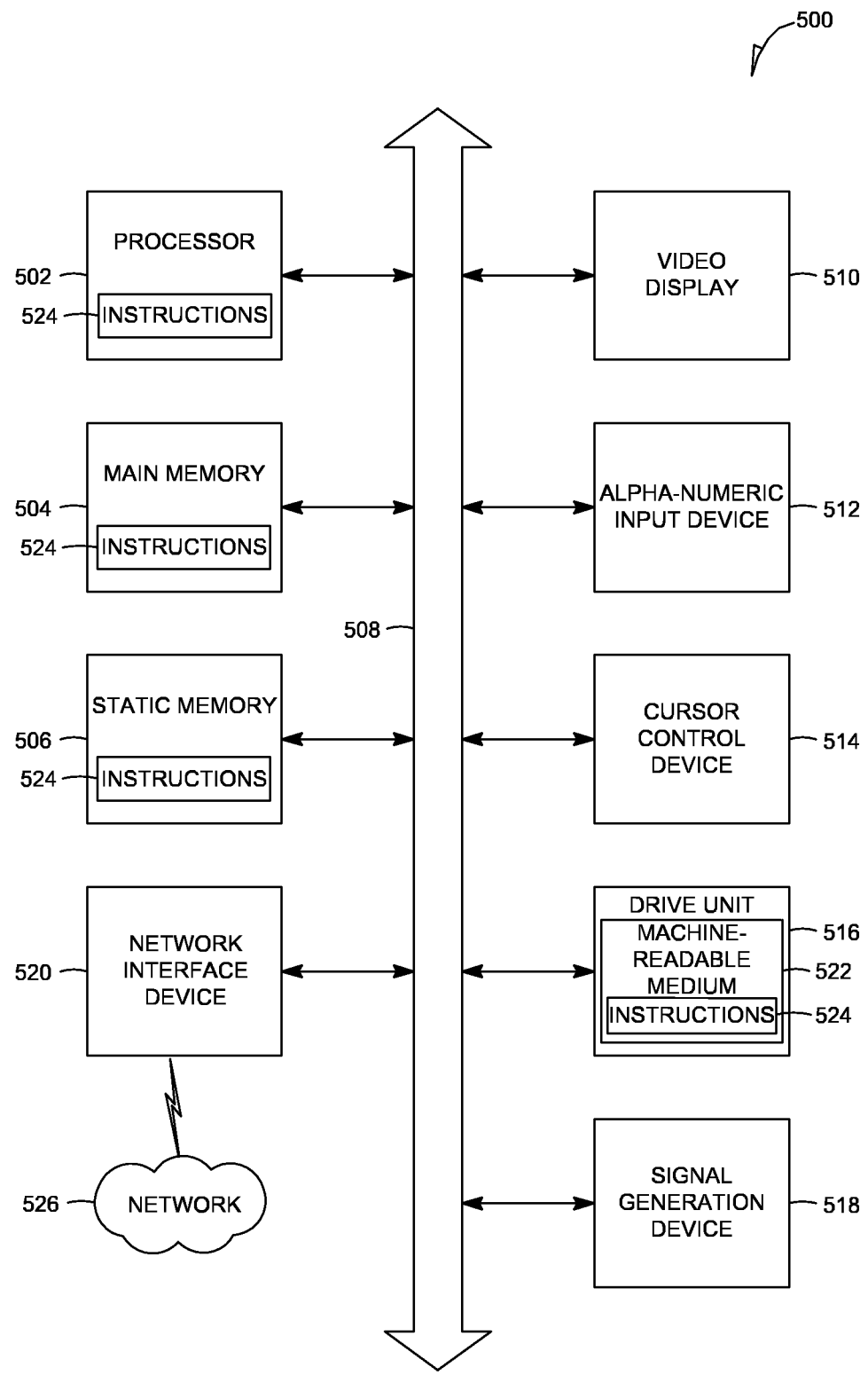
FIG. 5 is a block diagram of an exemplary completer system according to some embodiments.

FIG. 5 is a block diagram of an exemplary computer system 500, according to some embodiments, within which may be executed a set of instructions for causing the computer system 500 to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform anyone or more of the methodologies discussed herein.

The example computer system 500 includes a processor 502 (e.g., a central processing unit (CPU) a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software) 524 embodying any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present embodiments. The term "machine-readable medium" shall accordingly be taken to include, but not be limited to, solid-state memories, optical and magnetic media, and carrier wave signals.

Example embodiments described herein may provide technical benefits such as, but not limited to, efficient input of data into an online publication system, ease of locating a desired product within the online publication system by buyer, more efficient use of seller data to populate listings, and data collection by the user.

Thus, a method and system to automatically generate a listing using multiple identification services have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   at least one processor;
   a service selector configured to select one or more identification services, using the at least one processor, from a plurality of identification services based on a user input type for an item at an item selector user interface, the identification services to determine one or more identifications from at least a portion of the input;
   an identification selector configured to select a recommended identification based on the one or more identifications received from the one or more identification services;
   a profile selector user interface configured to receive a user selection of a user profile; and
   a display configured to display shipping options user interface based on the selected user profile.

2. The system of claim 1, wherein the input is selected from a group consisting of: an image, a text string, an audio file, and a video.

3. The system of claim 1, further comprising a type identifier to identify words, barcodes, symbols from an image.

4. The system of claim 1, wherein the service selector is further configured to select the one or more identification services based on respective past performances of the one or more identification services, 5. The system of claim 1, wherein the service selector is further configured to select the one or more identification services based on relative costs of the one or more identification services.

6. The system of claim 1, wherein the identification selector is further configured to provide a display of a list of at least a portion of the one or more identifications.

7. The system of claim 1, further comprising a category selector to assign a category based on the recommended identification.

8. The system of claim 7, wherein the category selector is further configured to provide an interface to a user to select a category.

9. The system of claim 1, wherein the identification selector is further configured to calculate a score for each of the one or more identifications.

10. The system of claim 9, wherein the score is based on at least two of the one or more identifications being the same.

11. The system of claim 9, wherein the score is based on one identification of the one or more identifications being the same as a previous identification performed for a user.

12. The system of claim 9, wherein the score is based on a demand fur a product described by the one or more identifications.

13. The system of claim 9, wherein the score is based on a supply for a product described by the one or more identifications.

14. A method comprising:
   selecting, by at least one processor, one or more identification services from a plurality of identification services based on a user input type for an item at an item selector user interface, the identification services to determine one or more identifications from at least a portion of the input;
   selecting a recommended identification based on the one or more identifications received from the one or more identification services;
   providing an interface for the user to select a user profile; and
   displaying shipping options based on the selected user profile.

15. The method of claim 14, further comprising selecting the one or more identification services based on respective past performances of the one or more identification services.

16. The method of claim 14, further comprising selecting the one or more identification services based on relative costs of the one or more identification services.

17. The method of claim 14, further comprising providing a display of a list of at least a portion of the one or more identifications.

18. The method of claim 14, further comprising assigning a category based on the recommended identification.

19. The method of claim 14, further comprising calculating a score for each of the one or more identifications.

20. A non-transitory machine-readable medium having instructions embodied thereon, the instructions executable by one or more machines to perform operations comprising:
   selecting one or more identification services from a plurality of identification services based on a user input type for an item at an item selector user interface, the identification services to determine one or more identifications from at least a portion of the input;
   selecting a recommended identification based on the one or more identifications received from the one or more identification services;
   providing an interface for the user to select a user profile; and displaying shipping options based on the selected user profile.

* * * * *

UNITED STATES PATENT AND TRADEMARK OFFICE
CERTIFICATE OF CORRECTION

PATENT NO. : 9,076,173 B2  
APPLICATION NO. : 13/663178  
DATED : July 7, 2015  
INVENTOR(S) : Hamilton et al.

Page 1 of 1

It is certified that error appears in the above-identified patent and that said Letters Patent is hereby corrected as shown below:

On title page 2, in column 2, under "Other Publications", line 2, delete "3 pgs." and insert --2 pgs.--, therefor In the claims, In column 11, line 63, in Claim 3, after "barcodes,", insert --or--, therefor In column 11, line 67, in Claim 4, delete "services," and insert --services.--, therefor In column 12, line 23, in Claim 12, delete "fur" and insert --for--, therefor Signed and Sealed this  
Twelfth Day of January, 2016

Michelle K. Lee  
*Director of the United States Patent and Trademark Office*